(12) United States Patent
Lee et al.

(10) Patent No.: US 10,849,178 B2
(45) Date of Patent: Nov. 24, 2020

(54) HANDLING OF CONFLICT CONFIGURATION IN DUAL CONNECTIVITY

(71) Applicant: LG ELECTRONICS INC., Seoul (KR)

(72) Inventors: Seungjune Lee, Seoul (KR); Sangwon Kim, Seoul (KR); Sunyoung Lee, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/336,090

(22) PCT Filed: Sep. 11, 2017

(86) PCT No.: PCT/KR2017/009933
§ 371 (c)(1),
(2) Date: Mar. 22, 2019

(87) PCT Pub. No.: WO2018/056623
PCT Pub. Date: Mar. 29, 2018

(65) Prior Publication Data
US 2019/0215886 A1 Jul. 11, 2019

Related U.S. Application Data

(60) Provisional application No. 62/397,937, filed on Sep. 22, 2016.

(51) Int. Cl.
*H04W 76/15* (2018.01)
*H04W 48/10* (2009.01)
(Continued)

(52) U.S. Cl.
CPC ........... *H04W 76/15* (2018.02); *H04W 48/10* (2013.01); *H04W 48/16* (2013.01); *H04W 88/06* (2013.01); *H04W 16/32* (2013.01)

(58) Field of Classification Search
CPC ..... H04W 76/15; H04W 76/16; H04W 48/10; H04W 48/16; H04W 88/06; H04W 16/24; H04W 16/32
See application file for complete search history.

(56) References Cited

U.S. PATENT DOCUMENTS 10,263,729 B2 * 4/2019 Vikberg .................... H04L 1/00
10,667,178 B2 * 5/2020 Xiong .................. H04W 88/06
(Continued)

FOREIGN PATENT DOCUMENTS

| KR | 1020140145527 | 12/2014 |
| KR | 1020150109174 | * 10/2015 |
| WO | 2015139763 | 9/2015 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9) 3GPP TS 36.300 V9.3.0, Mar. 2010, 166 pages.*
(Continued)

*Primary Examiner* — Afsar M Qureshi
(74) *Attorney, Agent, or Firm* — Lee Hong Degerman Kang Waimey (57) ABSTRACT

Method and apparatus for a user equipment (UE) supporting dual connectivity (DC) with a master node and a secondary node are disclosed. According to these, the UE receives first configuration information from the master node and second configuration information from the secondary node. The UE applies the first configuration information first. And, the UE transmits a new configuration request message to the secondary node, if the UE cannot apply the second configuration information after applying the first configuration information.

10 Claims, 8 Drawing Sheets

(51) Int. Cl.
  *H04W 48/16* (2009.01)
  *H04W 88/06* (2009.01)
  *H04W 16/32* (2009.01)

(56) References Cited

U.S. PATENT DOCUMENTS

| | | | |
|---|---|---|---|
| 2015/0245402 A1* | 8/2015 | Mochizuki | H04W 36/22 |
| | | | 370/331 |
| 2015/0312787 A1* | 10/2015 | Das | H04W 36/0033 |
| | | | 370/331 |
| 2015/0334769 A1 | 11/2015 | Kim et al. | |
| 2016/0057802 A1* | 2/2016 | Lee | H04W 76/19 |
| | | | 370/329 |
| 2017/0208488 A1* | 7/2017 | Hwang | H04W 76/34 |
| 2017/0265769 A1* | 9/2017 | Quinlan | A61B 5/04087 |
| 2019/0007268 A1* | 1/2019 | Wager | H04W 74/0833 |
| 2019/0281521 A1* | 9/2019 | Zhang | H04W 36/28 |

OTHER PUBLICATIONS

IEEE Standard for Information technology—Telecommunications and information exchange between systems Local and metropolitan area networks—Specific requirements, Part 11: Wireless LAN Medium Access Control (MAC) and Physical Layer (PHY) Specifications, IEEE Computer Society, IEEE Std Mar. 2012.*
PCT International Application No. PCT/KR2017/009933, Notification of Transmittal of the International Search Report and the Written Opinion of the International Searching Authority, or Declaration dated Jan. 5, 2018, 10 pages.

* cited by examiner

HANDLING OF CONFLICT CONFIGURATION IN DUAL CONNECTIVITY

CROSS-REFERENCE TO RELATED APPLICATIONS

This application is the National Stage filing under 35 U.S.C. 371 of International Application No. PCT/KR2017/009933, filed on Sep. 11, 2017, which claims the benefit of U.S. Provisional Application No. 62/397,937, filed on Sep. 22, 2016, the contents of which are all hereby incorporated by reference herein in their entirety.

TECHNICAL FIELD

The present invention relates to a wireless communication system supporting dual connectivity (DC). More specifically, the present invention related to a method and apparatus for handling of conflict configuration from a master node and a secondary node in DC.

BACKGROUND ART

As an example of a mobile communication system to which the present invention is applicable, a 3rd Generation Partnership Project Long Term Evolution (hereinafter, referred to as LTE) communication system is described in brief.

Figure 1:
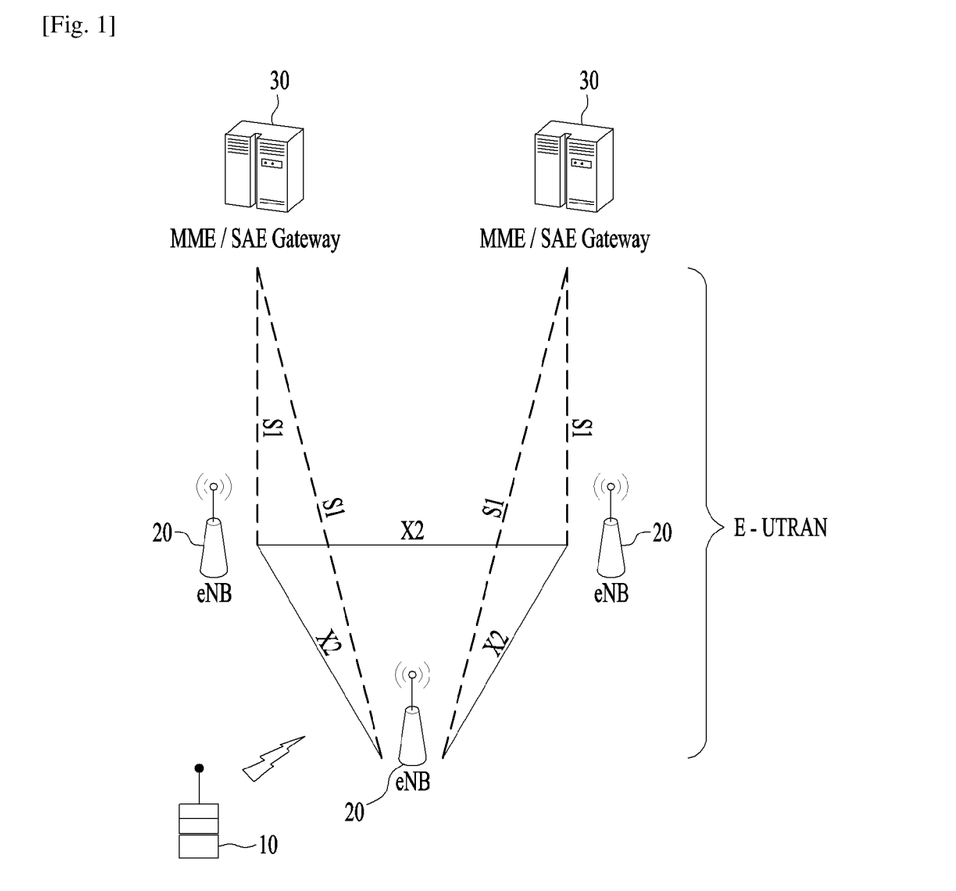
FIG. 1 is a block diagram illustrating network structure of an evolved universal mobile telecommunication system (E-UMTS)

FIG. 1 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 1, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

LTE system now evolves to 5G system, called as New Radio Access Technology (NR: New RAT). The deployment scenarios concerning NR are explained.

Figure 2:
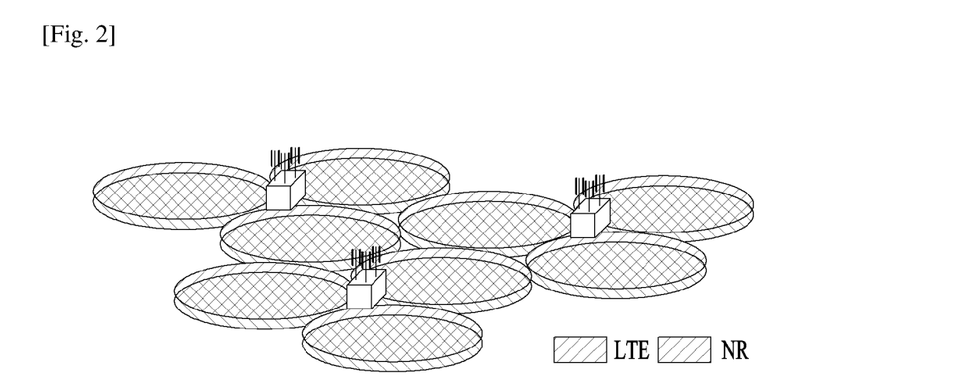
FIGS. 2-3 show deployment scenarios in terms of cell layout and Node B location where both NR and LTE coverage exists in the geographical area.
Figure 3:
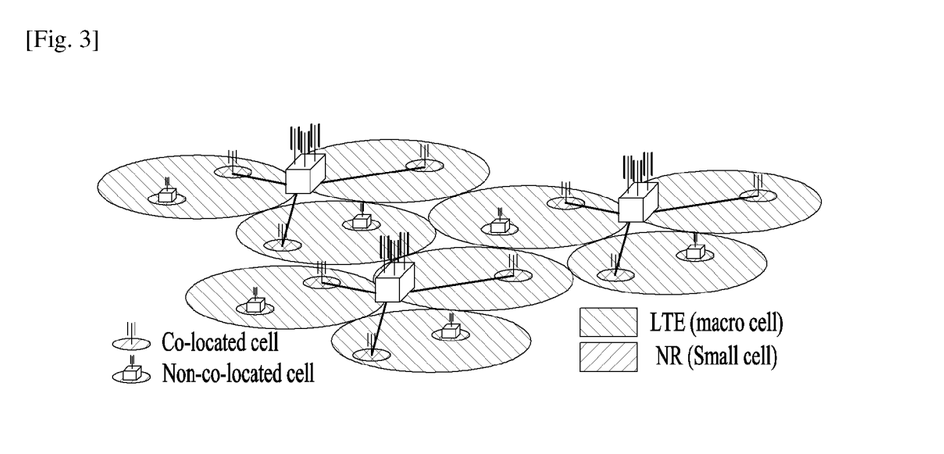

FIGS. 2-3 show deployment scenarios in terms of cell layout and Node B location where both NR and LTE coverage exists in the geographical area.

In terms of cell layout served by NR, the following scenarios are assumed:
 Homogeneous deployment where all of cells provide the similar coverage, e.g. macro or small cell only;
 Heterogeneous deployment where cells of different size are overlapped, e.g. macro and small cells.

FIG. 2 shows a scenario where both LTE and NR cells are overlaid and co-located providing the similar coverage. Both LTE and NR cells are macro or small cells. FIG. 2 shows another scenario where LTE and NR cells are overlaid, and co-located or not co-located, providing different coverage. In these figures, LTE serves macro cells and NR serves small cells. The opposite scenario is also considered. A co-located cell refers to a small cell together with a macro cell for which their eNB is installed at the same location. A non-co-located cell refers to a small cell together with a macro cell for which their eNB is installed at the different location.

DISCLOSURE OF INVENTION

Technical Problem

In 5G New RAT (NR), the Dual Connectivity (DC) between LTE and NR is supported even though the LTE and NR are different RAT. The Master node can be either an LTE eNB or an NR gNB, and the Secondary node can be either an LTE eNB or an NR gNB.

One issue in DC between LTE and NR is a capability coordination. As LTE and NR are different systems, they cannot understand capability signaling of the other system each other, and thus some coordination between them is needed.

Sometimes, the coordination between them is not successful, and the UE may receive configuration which is beyond its capability. For example, the UE has buffer size with 1 GB, but the UE receives LTE configuration of buffer size with 400 MB and NR configuration of buffer size with 800 MB.

A mechanism should be defined to handle this conflict configuration case.

Solution to Problem

To achieve these objects and other advantages and in accordance with the purpose of the invention, as embodied and broadly described herein, a method for a user equipment (UE) supporting dual connectivity (DC) with a master node and a secondary node, the method comprising: receiving first configuration information from the master node; receiving second configuration information from the secondary node; applying the first configuration information; and transmitting a new configuration request message to the secondary node, if the UE cannot apply the second configuration information after applying the first configuration information, is proposed.

The new configuration request message may include remaining UE capability information after applying the first configuration information. On the other hand, the new configuration request message may include only one or more elements of the second configuration information that the UE cannot apply.

The first and the second configuration information may include one or more elements of: radio frequency (RF) carrier/band combinations, Medium Access Control (MAC) capabilities, physical (PHY) capabilities, and a layer 2 (L2) buffer size.

Applying the first configuration information may be performed without applying the second configuration information, if the UE cannot apply the first and the second configuration information together.

The method may further comprises: receiving third configuration information from the secondary node in response to the new configuration request message.

Here, a first one of the master node and the secondary node may be a LTE (Long Term Evolution) eNB (evolved Node B), and a second one of the master node and the secondary node may be a NR (New RAT) gNB (gigabit Node B).

In other aspect of the present invention, a user equipment (UE) supporting dual connectivity (DC) with a master node and a secondary node, the UE comprising: a transceiver configured to receive first configuration information from the master node and second configuration information from the secondary node; and a processor configured to: apply the first configuration information, and control the transceiver to transmit a new configuration request message to the secondary node, if the UE cannot apply the second configuration information after applying the first configuration information, is proposed.

The processor may be further configured to include remaining UE capability information, after applying the first configuration information, in the new configuration request message.

The first and the second configuration information may include one or more elements of: radio frequency (RF) carrier/band combinations, Medium Access Control (MAC) capabilities, physical (PHY) capabilities, and a layer 2 (L2) buffer size.

The processor may be further configured to include only one or more elements of the second configuration information, that the UE cannot apply, in the new configuration request message.

The processor may apply the first configuration information without applying the second configuration information, if the UE cannot apply the first and the second configuration information together.

The transceiver may further receive third configuration information from the secondary node in response to the new configuration request message.

A first one of the master node and the secondary node may be a LTE (Long Term Evolution) eNB (evolved Node B), and a second one of the master node and the secondary node may be a NR (New RAT) gNB (gigabit Node B).

Advantageous Effects of Invention

According to embodiments of the present invention, the UE and the network can handle the conflict of configuration based on UE capability.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the present invention related to a method and apparatus for handling of conflict configuration from a master node and a secondary node in DC.

In NR DC between LTE and NR, as LTE and NR are different systems, they cannot understand capability signaling of the other system each other. Followings are possible solutions for capability coordination in NR DC situation.

Figure 4:
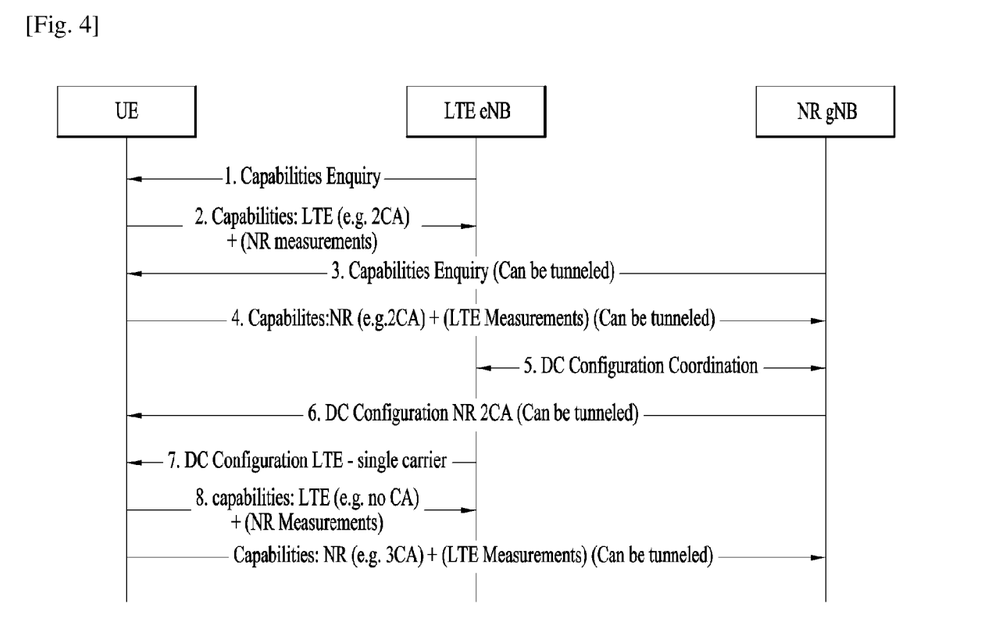
FIGS. 4-6 shows examples for capability coordination in NR DC.

FIG. 4 shows an example for capability coordination in NR DC.

In the example of FIG. 4, suppose of no LTE/NR UE capability coordination across RATs.

In step 1, LTE eNB enquires the UE capability information.

In step 2, UE signals LTE capability and NR measurement capability to LTE eNB (Independent LTE specific UE capability information).

In step 3, NR gNB tells UE the specific frequency bands for UE capability signaling optimization.

In step 4, UE signals NR capability and LTE measurement capability to NR gNB (Independent NR specific UE capability information).

In step 5, Master and Secondary nodes coordinate the configurations, e.g., flow and security configuration.

In step 6, NR gNB configures UE with 2 NR carriers CA.

In step 7, LTE eNB configures UE with a single LTE carrier.

In step 8, UE notifies LTE eNB the change of LTE UE capability information (e.g. no CA support in the UE capability information) based on the new configuration received in step 7.

In step 9, UE notifies NR gNB the change of NR UE capability information (e.g. 3 CA support in the UE capability information) based on the new configuration received in step 6.

According to this solution, UE can adjust the RRC configuration according to the latest UE status (e.g. available resources, conflict with configurations from the other RAT). And, each RAT can operate completely independently without any UE capability coordination.

However, this solution has drawback in that ping-pong capability updates and reconfigurations may happen across RATs (depend on the rules introduced). Also, NW has no direct control of UE resource split across RATs. Thus, control is possible by releasing resources, and expecting them to be recovered on the other RAT.

Figure 5:
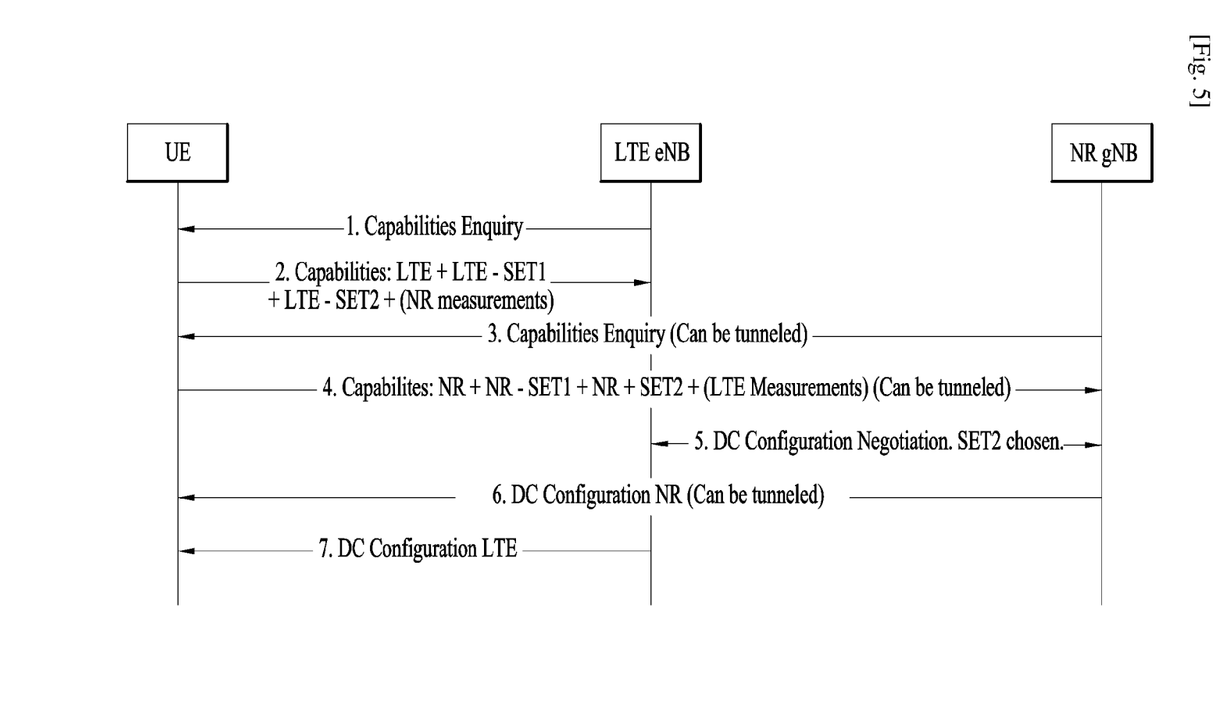

FIG. 5 shows another example for capability coordination in NR DC.

In the example of FIG. 5, UE capability sets based coordination is proposed.

In step 1, LTE eNB enquires the UE LTE capabilities.

In step 2, UE signals LTE capability sets and NR measurement capability to LTE eNB.

In step 3, NR gNB enquires for the UE NR UE capabilities.

In step 4, UE signals NR capability sets and LTE measurement capability to NR gNB.

In step 5, Master and Secondary nodes coordinate the configurations by agreeing on compatible sets. Let us assume set2 was chosen.

In step 6, NR gNB configures UE according to NR UE capability set2.

In step 7, LTE eNB configures UE according to LTE UE capability set2.

According to this solution, each RAT's NB doesn't need to comprehend any configuration/capability of the other RAT other than understand which sets are compatible (can be used for simultaneous configuration). Also, Ping-pong reconfiguration won't happen across RATs. Moreover, NW has some choices for UE resource split across the RATs.

However, there is a trade-off between the UE's ability to finely express the resource split between RATs, and the number of sets.

Figure 6:
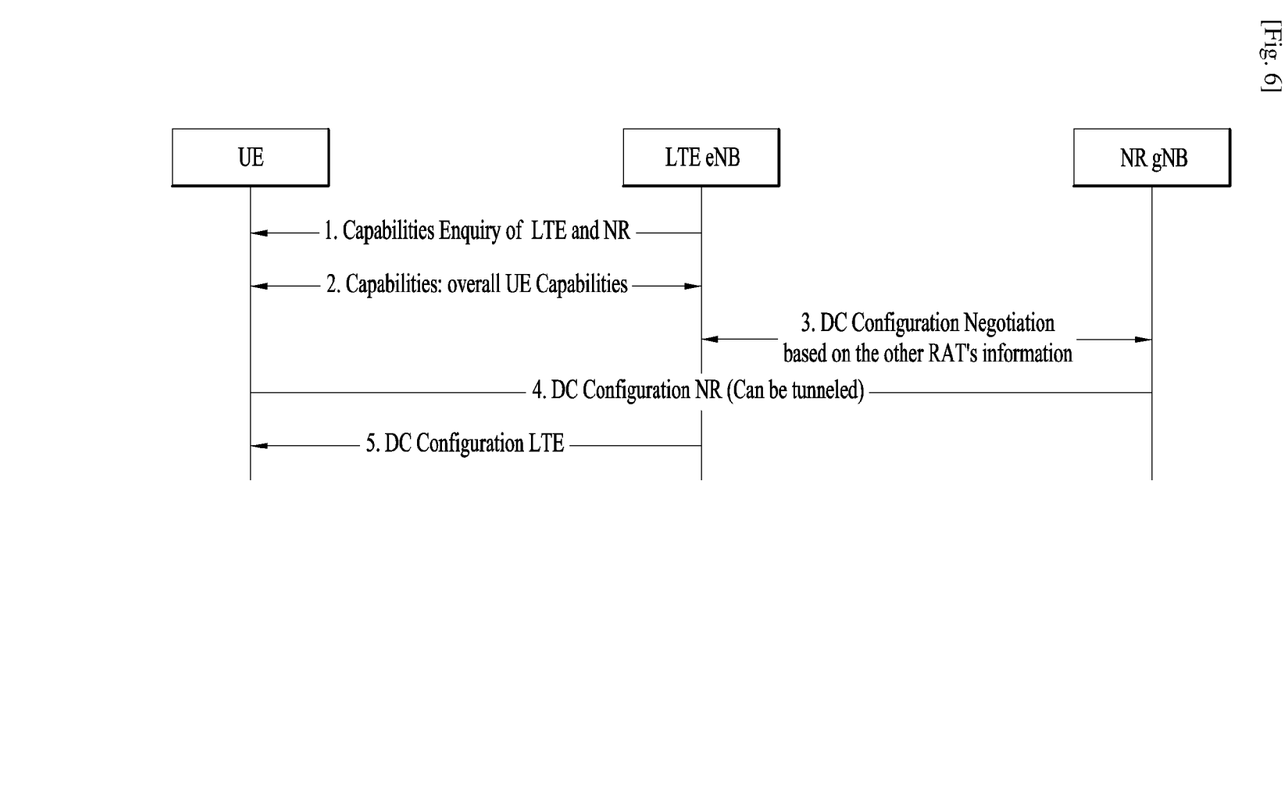

FIG. 6 shows still another example for capability coordination in NR DC.

In the example of FIG. 6, ASN.1. (other RAT's RRC/IE) based coordination is proposed.

In step 1, LTE eNB enquires the UE capability information.

In step 2, UE signals overall capabilities to LTE eNB.

In step 3, Master and Secondary nodes coordinate the configurations via full RAT specific configuration across RATs in ASN.1.

In step 4, NR gNB configures UE according to the outcome of the coordination given by the step 3.

In step 5, LTE eNB configures UE according to the outcome of the coordination given by the step 3.

This solution can be viewed as the most flexible one at RAN to split the UE capabilities across the RATs. However, according this, independent evolution of LTE and NR is not possible. For every capability added to NR that affects the combination with LTE, the LTE Specification needs to be updated, and vice-versa. Also, different deployment scenarios require completely different messages and procedures.

Figure 7:
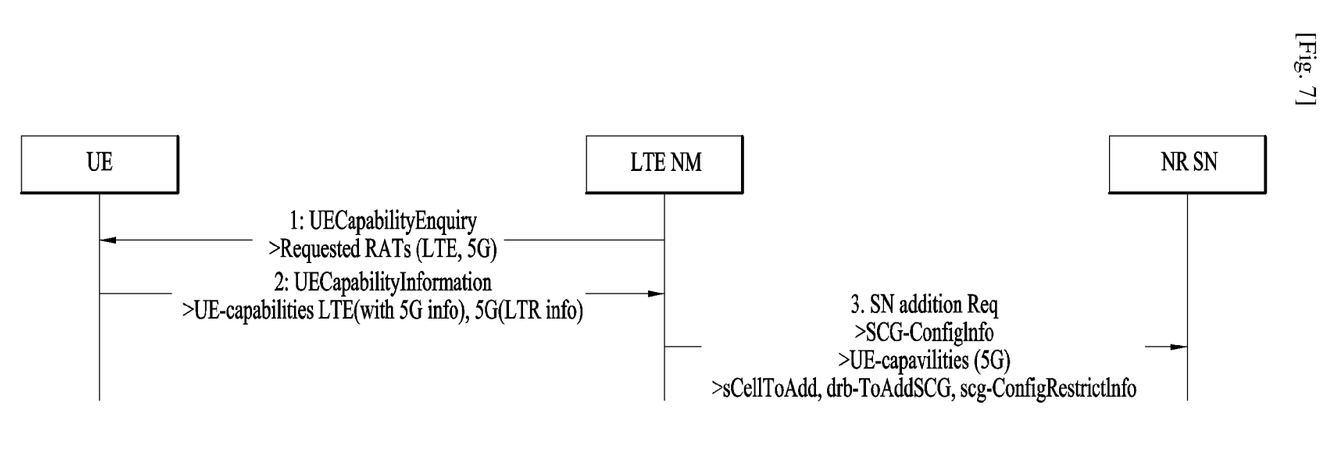
FIGS. 7 and 8 are for explaining how the configuration dependencies/conflicts are detected and how conflict resolution is negotiated.
Figure 8:
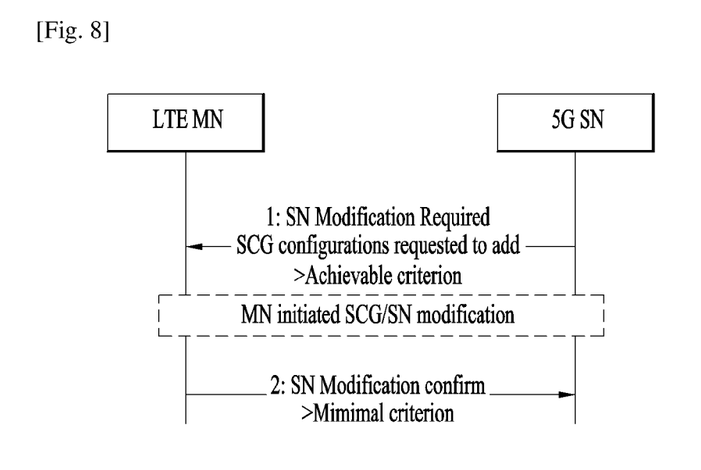

FIGS. 7 and 8 are for explaining how the configuration dependencies/conflicts are detected and how conflict resolution is negotiated.

In FIGS. 7 and 8, LTE eNB is supposed as Master Node (MN) and NR gNB is supposed as Secondary Node (SN).

Each node detects dependencies based on their own capabilities. I.e. the LTE capabilities include information about 5G i.e. for each LTE bands or band combinations, there is a list of 5G band (or band combinations) that cannot be supported simultaneously (i.e. if the concerned 5G band or band combination would be configured, the concerned LTE band or band combination cannot be supported anymore). The 5G capabilities include the similar information about conflicting LTE bands (and/or band combinations).

In case there are configuration dependencies and there is a need to select between different configuration options (e.g. whether to extend aggregation on LTE or on NR side), we propose the MN decides (as in LTE DC). As the MN should not have be aware of NR particulars/characteristics, we think the negotiation would be based on achievable throughput. i.e. The MN requests SN to configure aggregation on NR side while it can ensure a certain achievable throughput.

However, this solution also leads to the problem that independent evolution of LTE and NR is not possible. For every capability added to NR that affects the combination with LTE, the LTE Specification needs to be updated, and vice-versa.

Therefore, according to one preferred embodiment of the present invention, following scheme is proposed.

When the UE receives configuration information from different nodes, and if applying the received configuration is beyond its capability, it is proposed that the UE applies the configuration received from the Master node as it is, but the UE rejects the configuration received from the Secondary node and requests a new configuration complying with its capability from the Secondary node by sending a Secondary configuration request message to the Secondary node.

The Secondary configuration request message may contain all elements of capability information that can be used by Secondary node.

In other example, the Secondary configuration request message may contain only the conflict element of capability information that can be used by Secondary node.

The capability information, that can be used by Secondary node, means that the remaining UE capability after applying the Master node configuration.

The Master node is either an LTE eNB or an NR gNB, and the Secondary node is either an LTE eNB or an NR gNB.

The capability information may include following elements:

(1) RF carrier/band combinations
(2) MAC capabilities e.g. max. bits in TTI, soft bits
(3) PHY capabilities e.g. MIMO layers
(4) L2 buffer size.

Figure 9:
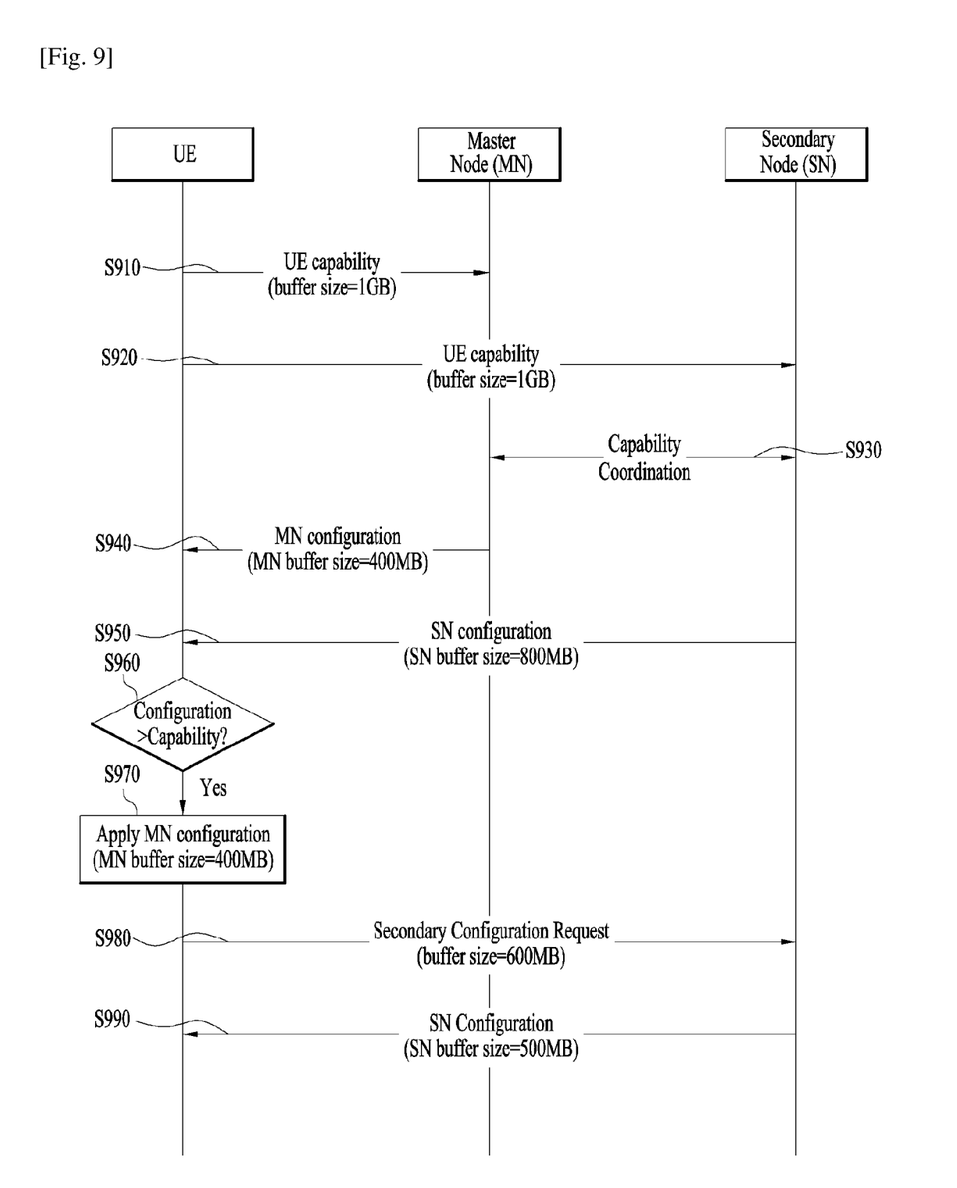
FIG. 9 shows an example according to the preferred embodiment of the present invention.

FIG. 9 shows an example according to the preferred embodiment of the present invention.

The Master node may request the UE to send the capability information prior to this step (not shown). In FIG. 9, the UE sends UE capability information to the Master node (S910). The UE capability information may include all elements of capability information. In this example, the UE informs that its buffer size is 1 GB.

The Secondary node also may request the UE to send the capability information. In FIG. 9, the UE sends UE capability information to the Secondary node (S920). The UE capability information may include all elements of capability information. In this example, the UE informs that its buffer size is 1 GB.

The Master node and the Secondary node may coordinate the UE capability via X2 interface (S930). In this example, the buffer size is not well coordinated.

The Master node may send MN configuration to the UE including MN buffer size=400 MB (S940). The MN buffer size means that the UE's buffer size that can be used for transmitting/receiving packets to/from the Master node.

On the other hand, the Secondary node may send SN configuration to the UE including SN buffer size=800 MB (S950). The SN buffer size means that the UE's buffer size that can be used for transmitting/receiving packets to/from the Secondary node.

In this embodiment, the UE can compare the configuration received from both Master and Secondary node with its capability (S960). The UE founds that the UE cannot comply with the received configuration as it is beyond its capability (i.e. MN buffer size 400 MB+SN buffer size 800 MB>UE buffer size 1 GB).

In this case, the UE may apply MN configuration as it is, i.e. MN buffer size=400 MB (S970). And, the UE may send Secondary configuration request message including the conflict capability element to the Secondary node (S980). For the conflict capability element, the UE indicates the remaining UE capability after applying the MN configuration. In this example, as 400 MB is allocated to MN buffer size, the UE indicates buffer size=600 MB in the Secondary configuration request message.

The Secondary node may consider that the value in the Secondary configuration request message is the maximum value, and sends a new SN configuration message to the UE within the range of the maximum value (S990). In this example, the Secondary node configures SN buffer size=500 MB which is within the UE's capability.

Figure 10:
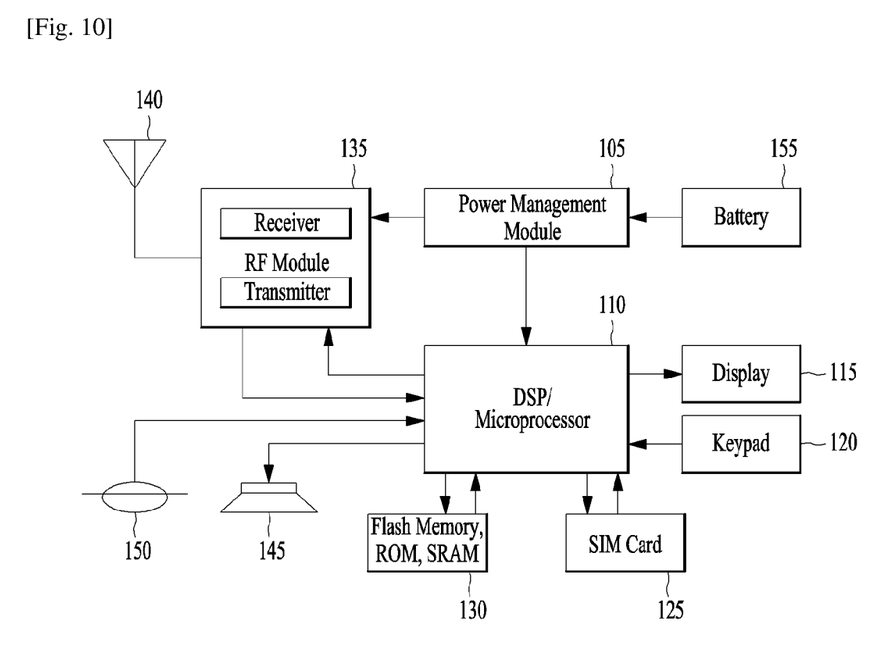
FIG. 10 is a block diagram of a communication apparatus according to an embodiment of the present invention.

FIG. 10 is a block diagram of a communication apparatus according to an embodiment of the present invention.

The apparatus shown in FIG. 10 can be a user equipment (UE) and/or eNB adapted to perform the above mechanism, but it can be any apparatus for performing the same operation.

As shown in FIG. 10, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 10 may represent a UE comprising a receiver (135) configured to receive signal from the network, and a transmitter (135) configured to transmit signals to the network. These receiver and the transmitter can constitute the transceiver (135). The UE further comprises a processor (110) connected to the transceiver (135: receiver and transmitter).

Also, FIG. 10 may represent a network apparatus comprising a transmitter (135) configured to transmit signals to a UE and a receiver (135) configured to receive signal from the UE. These transmitter and receiver may constitute the transceiver (135). The network further comprises a processor (110) connected to the transmitter and the receiver.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', 'gNB', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP system, the present invention is applicable to a variety of wireless communication systems e.g. IEEE system, in addition to the 3GPP system.

The invention claimed is:

1. A method for a user equipment (UE) supporting dual connectivity (DC) with a master node and a secondary node, the method comprising:
receiving first configuration information for a layer 2 (L2) buffer size from the master node;
receiving second configuration information for the L2 buffer size from the secondary node;
applying the first configuration information; and
transmitting a new configuration request message to the secondary node, if the UE cannot apply the second configuration information after applying the first configuration information,
wherein a first one of the master node and the secondary node is a LTE (Long Term Evolution) eNB (evolved Node B), and
wherein a second one of the master node and the secondary node is a NR (New RAT) gNB (gigabit Node B).

2. The method of claim 1, wherein the new configuration request message includes remaining UE capability information for the L2 buffer size after applying the first configuration information.

3. The method of claim 1, wherein the new configuration request message includes only one or more elements of the second configuration information that the UE cannot apply.

4. The method of claim 1, wherein applying the first configuration information is performed without applying the second configuration information, if the UE cannot apply the first and the second configuration information together.

5. The method of claim 1, further comprising:
receiving third configuration information for the L2 buffer size from the secondary node in response to the new configuration request message.

6. A user equipment (UE) supporting dual connectivity (DC) with a master node and a secondary node, the UE comprising:
a transceiver configured to receive first configuration information for a layer 2 (L2) buffer size from the master node and second configuration information for the L2 buffer size from the secondary node; and
a processor configured to:
apply the first configuration information, and
control the transceiver to transmit a new configuration request message to the secondary node, if the UE cannot apply the second configuration information after applying the first configuration information,
wherein a first one of the master node and the secondary node is a LTE (Long Term Evolution) eNB (evolved Node B), and
wherein a second one of the master node and the secondary node is a NR (New RAT) gNB (gigabit Node B).

7. The UE of claim 6, wherein the processor is further configured to include remaining UE capability information for the L2 buffer size, after applying the first configuration information, in the new configuration request message.

8. The UE of claim 6, wherein the processor is further configured to include only one or more elements of the second configuration information, that the UE cannot apply, in the new configuration request message.

9. The UE of claim 6, wherein the processor applies the first configuration information without applying the second configuration information, if the UE cannot apply the first and the second configuration information together.

10. The UE of claim 6, wherein the transceiver further receives third configuration information for the L2 buffer size from the secondary node in response to the new configuration request message.

\* \* \* \* \*